United States Patent
Claesson et al.

(10) Patent No.: US 7,340,985 B2
(45) Date of Patent: Mar. 11, 2008

(54) METHOD AND DEVICE FOR VIBRATION CONTROL

(75) Inventors: Ingvar Claesson, Dalby (SE); Thomas Lago, Provo, UT (US); Lars Hakansson, Helsingborg (SE)

(73) Assignee: Staffansboda Compagnie AB, Forsheda (SE)

( * ) Notice: Subject to any disclaimer, the term of this patent is extended or adjusted under 35 U.S.C. 154(b) by 389 days.

(21) Appl. No.: 10/997,992

(22) Filed: Nov. 29, 2004

(65) Prior Publication Data

US 2005/0109174 A1   May 26, 2005

Related U.S. Application Data

(63) Continuation of application No. 09/838,328, filed on Apr. 20, 2001, now abandoned, which is a continuation of application No. PCT/SE99/01883, filed on Oct. 19, 1999.

(30) Foreign Application Priority Data

Oct. 22, 1998   (SE)   ................... 9803605

(51) Int. Cl.
  B23Q 17/12   (2006.01)
  B23B 27/00   (2006.01)
  B23B 29/00   (2006.01)
(52) U.S. Cl. .......................... 82/163; 82/904; 82/158; 82/118; 173/162.1; 409/141; 408/143
(58) Field of Classification Search .................. 82/118, 82/173, 904, 163, 158, 161, 903, 1.11; 173/162.1; 409/141; 408/6, 11, 143
See application file for complete search history.

(56) References Cited

U.S. PATENT DOCUMENTS

| | | | | |
|---|---|---|---|---|
| 3,671,840 A | * | 6/1972 | Meyer et al. | ................ 318/571 |
| 4,409,659 A | | 10/1983 | Devine | |
| 4,620,121 A | * | 10/1986 | Mishiro | ................. 310/323.18 |
| 4,741,231 A | * | 5/1988 | Patterson et al. | ............. 82/118 |
| 4,849,668 A | * | 7/1989 | Crawley et al. | ............ 310/328 |
| 5,043,621 A | | 8/1991 | Culp | |
| 5,170,103 A | * | 12/1992 | Rouch et al. | ................ 318/128 |
| 5,315,203 A | | 5/1994 | Bicos | |
| 5,374,011 A | | 12/1994 | Lazarus et al. | |
| 5,485,053 A | | 1/1996 | Baz | |
| 5,687,462 A | | 11/1997 | Lazarus et al. | |

(Continued)

FOREIGN PATENT DOCUMENTS

JP   63180401   7/1988

(Continued)

*Primary Examiner*—Monica Carter
*Assistant Examiner*—Sara Addisu
(74) *Attorney, Agent, or Firm*—Birch, Stewart, Kolasch & Birch, LLP

(57) ABSTRACT

A device and method for vibration control in a machine for cutting, said machine comprising a cutting tool supported by a tool holder. The device comprises a control unit and converting means which are connectible to the control unit and comprise a vibration sensor and an actuator. The actuator comprises an active element which converts an A.C. voltage supplied by the control unit to the actuator into dimensional changes. Said active element is adapted to be embedded in the body of the tool holder and in such manner that said dimensional changes impart bending to the body of the tool holder.

22 Claims, 3 Drawing Sheets

U.S. PATENT DOCUMENTS

| | | |
|---|---|---|
| 5,810,528 A | 9/1998 | O'Connor et al. |
| 5,816,122 A | 10/1998 | Benning et al. |
| 5,913,955 A | 6/1999 | Redmond et al. |
| 5,938,503 A | 8/1999 | Cook et al. |
| 6,008,610 A | 12/1999 | Yuan et al. |
| 6,069,433 A | 5/2000 | Lazarus et al. |
| 6,146,060 A | 11/2000 | Rydberg et al. |
| 6,208,497 B1 | 3/2001 | Seale et al. |
| 6,694,213 B2 * | 2/2004 | Claesson et al. ............ 700/169 |
| 6,776,563 B2 * | 8/2004 | Shamoto et al. ............ 409/293 |
| 6,925,915 B1 * | 8/2005 | Claesson et al. ............ 82/133 |
| 2004/0155558 A1 * | 8/2004 | Cuttino et al. ............ 310/317 |

FOREIGN PATENT DOCUMENTS

| | | |
|---|---|---|
| JP | 64-75933 A * | 3/1989 |
| JP | 430938 | 2/1992 |
| WO | WO 9220482 | 11/1992 |

* cited by examiner

METHOD AND DEVICE FOR VIBRATION CONTROL

This application is a continuation of U.S. patent application Ser. No. 09/838,328 filed on Apr. 20, 2001 now abandoned which is a Continuation of PCT International Application No. PCT/SE99/01883 filed on Oct. 19, 1999, which was published in English and designated the United States and on which priority is claimed under 35 USC §120 and which application claims priority of Application No. 9803605-6 filed in Sweden on Oct. 22, 1998 under 35 USC §119, the entire contents of all are hereby incorporated by reference.

BACKGROUND OF THE INVENTION

1. Field of the Invention

The present invention relates to a method and a device for vibration control, and more specifically a method, a device and a tool holder for vibration control in cutting.

2. Background Art

In cutting, such as turning, drilling, milling or planing, dynamic motion arises between the tool and the workpiece. The motion is largely due to the fact that the chip-forming process, i.e. the removal of the generally relatively hard material from the workpiece, results in dynamic excitation of the tool, especially the tool holder. The dynamic excitation results in a dynamic motion, in the form of, for instance, elastic bending or torsion, of the tool and the tool holder. The chip-forming process is largely stochastic and the excitation results in tool vibrations and noise. In addition to thus causing problems in the working environment, the dynamic motion also affects the evenness of the surface of the workpiece and the service life of the tool.

It is therefore important to reduce the dynamic motion as far as possible. It is known that the vibration problem is closely connected with the dynamic stiffness in the construction of the machine and the material of the workpiece. It has therefore been possible to reduce the problem to some extent by designing the construction of the machine in a manner that increases the dynamic stiffness.

An important part of the construction is the actual tool holder. The cutting tool, for instance turning insert (or tooth), milling teeth or drilling teeth, is rigidly supported by the tool holder. Consequently the vibrations arising between the cutting edge and the workpiece are transferred almost completely to the tool holder. In many cases, it is the lack of dynamic stiffness of the tool holder that is a main problem.

Efforts have therefore recently been made to increase the dynamic stiffness of the actual tool holder by means of active technique in order to control the response of the tool. This means that active control of the tool vibrations is applied.

The active control comprises the introduction of secondary vibrations, or countervibrations, in the tool by means of a secondary source which is often called actuator. The actuator is operated in such manner that the countervibrations interfere destructively with the tool vibrations.

U.S. Pat. No. 4,409,659 discloses an example of such a control unit. An ultrasonic actuator is arranged on the tool holder and produces countervibrations in the tool. The operating current of the actuator is controlled according to physical parameters that are measured and by means of the work of the actuator are kept within defined limits. This construction is unwieldy since the actuator is a compara- tively large component which must be mounted on a suitable surface of the tool holder. Moreover, the directive efficiency is not quite distinct.

JP-63,180,401 discloses a very different solution where the actuator is built into the tool holder which holds a turning insert. A laterally extending through hole which is rectangular in cross-section is formed in the tool holder. A piezoelectric actuator, in series with a load detector, is fixed between the walls that define the hole in the longitudinal direction of the tool holder. The load detector detects the vibrations and is used by a control unit to generate, via the actuator, countervibrations which reduce the dynamic motion. This construction necessitates a considerable modification of the tool holder and indicates at the same time that the designer has not been aware of the essence of the excitation process. In fact, the modification counteracts the purpose of the construction by reducing the stiffness of the tool holder in the most important directions, above all vertically, which in itself causes a greater vibration problem, or alternatively means that the dimensions of the tool holder must be increased significantly in order to maintain the stiffness. During turning, the rotating workpiece produces a downwardly directed force on the cutting edge. When the cutting edge offers resistance, material is broken away from the workpiece. In this context, most of the vibrations arise. In JP-63,180,401, one imagines that the surface of the workpiece is uneven (wave-like) and thus mainly excites the tool holder in its longitudinal direction. Via the actuator, one generates an oscillation in opposition towards the wave pattern and thus obtains a constant cutting depth.

There is thus a need for a solution which controls the most essential vibrations in cutting, such as turning, milling, drilling or planing, and which causes a minimum of negative effects, such as bulky projections of dynamically weakening modifications, and still has a good effect.

SUMMARY OF THE INVENTION

An object of the present invention is to provide a device and a method for controlling of tool vibrations, said device and said method having no or at least a negligible negative effect on the dimensions of the tool.

Another object of the present invention is to provide a device and a method for controlling of tool vibrations, said device and said method having no or at least a negligible negative effect on the mechanical properties of the tool.

A further object of the invention is to provide a device and a method for controlling of tool vibrations, said device and said method producing a directed and direct control of the tool vibrations.

One more object of the invention is to provide a device and a method for controlling of tool vibrations, said device and said method enabling control of tool vibrations in an optional direction.

The objects with regard to a device are achieved by a device for vibration control in a machine for cutting, said machine comprising a cutting tool supported by a tool holder, the device comprising a control unit and converting means which are connectible to the control unit and comprise a vibration sensor and an actuator, and the actuator comprising an active element which converts an A.C. voltage supplied by the control unit across the actuator into dimensional changes. Said active element is adapted to be embedded in the body of the tool holder, and it is adapted to be embedded in such manner that said dimensional changes impart bending to the body of the tool holder.

The objects with regard to a method are achieved by a method for vibration control in cutting, comprising the steps of detecting the vibrations of a tool holder during cutting, and generating control vibrations in the tool holder, by means of at least one active element which is electrically controllable to dimensional changes. The method is characterised by the steps of embedding said active element in the body of the tool holder and, for generating the control vibrations, imparting bending to the body of the tool holder by generating at least one control voltage and applying the control voltage across said active element, and by varying the control voltage according to the detected vibrations.

The idea of embedding, according to the invention, at least one active element in the tool holder implies a minimal modification of the tool holder and at the same time uses the rapidity and the capability of changing dimensions of the active element in an optimal manner. The embedding makes it possible to transfer more efficiently the dimensional change direct to the body of the tool holder and with maximum efficiency.

The prior-art technique according to JP-63,180,401 where the actuator element is arranged freely except for the end walls gives space for outwards bending of the actuator element, whereby power is lost. The embedding is also advantageous by the device being useable in practice since it is protected against cutting fluids and chips. The known devices are possibly useable for laboratories, but not in the industry.

The device is adapted to impart bending to the tool holder through the arrangement of the active element/elements. The corresponding actuator element in JP-63,180,401 is deliberately arranged so that the dimensional change occurs along the longitudinal axis of the tool holder, which does not result in bending. This depends on the above-mentioned lack of knowledge of what primarily causes the vibration problems. Thus one has not realised that the most important excitation forces have any other direction but parallel with said longitudinal axis. Even with this knowledge, the construction according to JP-63,180,401, however, is not easily adjustable to any other kind of mounting than the one shown.

The active element according to the invention can be made small. This makes it easy to build the active element into the tool holder when manufacturing the same without any detrimental effect on the mechanical properties of the tool holder. Besides it will be possible later to mount the element in existing tool holders.

Moreover, the mounting will be flexible since the active element may be mounted with an optional orientation. Consequently it will be possible to achieve maximum controllability for vibrations of practically any direction whatever.

BRIEF DESCRIPTION OF THE DRAWINGS

The invention will now be described in more detail with reference to the accompanying drawings, in which FIG. 1 exemplifies in a perspective view the application of forces on a cutting tool.

DETAILED DESCRIPTION OF EMBODIMENTS

A basic object of the invention is to counteract the arising of vibrations causing noise, wear and uneven surfaces in connection with cutting of a workpiece. The casual relation for the arising of vibrations in cutting has been described above. A correctly performed vibration control according to the invention obviates the problems and results in an excellent surface finish.

Figure 1:
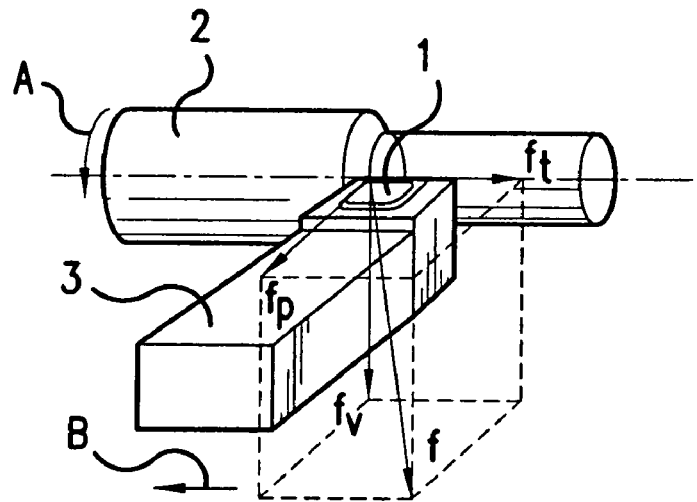

FIG. 1 shows an example of forces to which a tool 1, in this case a turning insert, is exposed owing to the working of a workpiece 2. The tool 1 is supported by a tool holder 3, with which the tool 1 is rigidly connected. The workpiece 2 rotates in the direction of arrow A. The tool holder 3 moves in a direction of feed indicated by arrow B. The rotation of the workpiece 2 and the motion of the tool holder 3 together generate a resultant force as illustrated by arrow f. The resultant force f can be divided into components $f_f$, $f_p$ and $f_v$. As appears from FIG. 1, the dominating component is $f_v$ which designates the force required to remove material from the workpiece 2.

Figure 2:
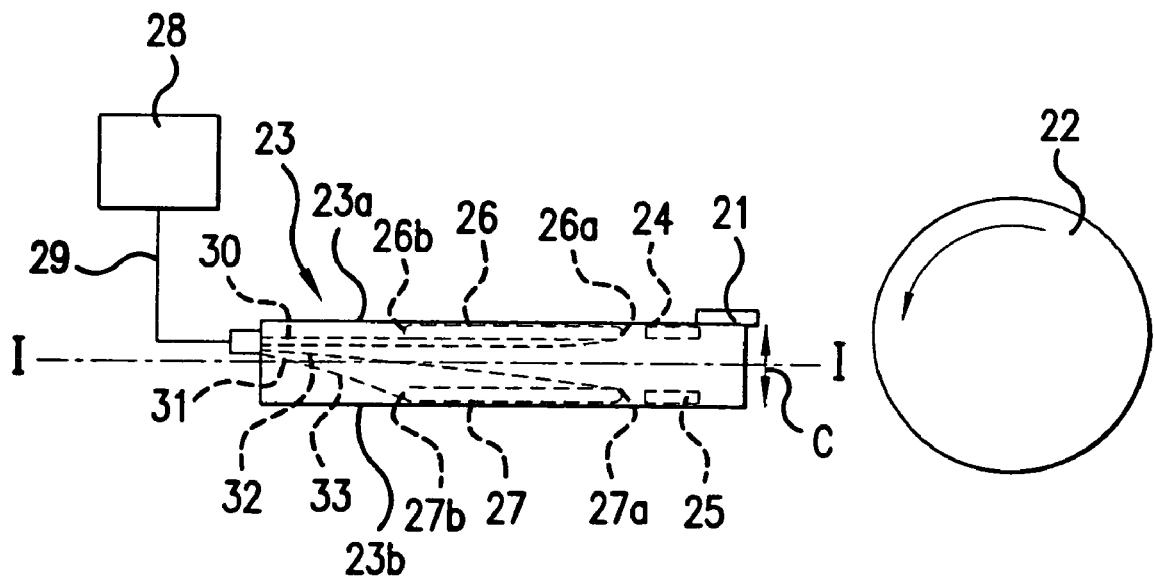
FIG. 2 is a schematic cross-sectional view of an embodiment of the invention applied to a tool for turning.

FIG. 2 exemplifies an embodiment of the inventive device and how this embodiment is used in turning. FIG. 2 is a schematic longitudinal cross-section of a tool in the form of a turning insert 21, and a tool holder in the form of a turning insert holder 23, which correspond to the tool 1 and the tool holder 3, respectively, in FIG. 1. A rotating workpiece is shown in cross-section at 22. The inventive device is in this example arranged to reduce/counteract the vibrations caused by the force component $f_v$ and indicated by arrow C. The device comprises converting means, which consist of plate-shaped sensors 24, 25 and plate-shaped actuators 26, 27. The actuators 26, 27 comprise active elements, here one element each, which in this embodiment consist of piezoceramic elements which change dimension when an electric voltage is applied across them. The dimensional change is related to the voltage. A piezoceramic element can in turn be designed as a unit or advantageously be made up as a so-called stack and/or of several partial elements. Thus, the element can be a solid body or a plurality of individual, but composed and interacting bodies. The sensors 24, 25 are piezoelectric crystals which generate an electric voltage when subjected to forces. The device further comprises a control unit 28 which is electrically connected to the sensors 24, 25 and the actuators 26, 27 via a conduit 29 containing a plurality of conductors. For the sake of clarity, only those conductors 30-33 are shown in the tool holder 23 which are connected to the actuators 26, 27, but of course conductors are also arranged for the sensors 24, 25.

The active elements, i.e. the piezoceramic elements, 26, 27 are embedded in the tool holder 23. In this case, and as a preferred embodiment, the embedding is made by casting. The casting is carried out by forming for each active element 26, 27 a recess in the body of the tool holder 23, whereupon the active element 26, 27 is arranged therein and covered by casting. The active element 26, 27 is glued preferably to the bottom surface of the recess. The sensors 24, 25 are fixed by casting in the same way as the active elements. The conductors 30-33 are also cast into the tool holder 23.

The converting means 24-27 are oppositely arranged in pairs and in parallel, in the form of one pair of sensors 24, 25 and one pair of actuators 26, 27. An upper sensor 24 of the sensors 24, 25 is arranged close to the upper side 23a of the tool holder 23, and a lower sensor 25 of the sensors 24, 25 is arranged close to the underside 23b of the tool holder 23. The actuators 26, 27 are arranged correspondingly, i.e.

with an upper and a lower actuator 26, 27 arranged close to the upper side 23*a* and the underside 23*b*, respectively, of the tool holder 23.

Figure 5:
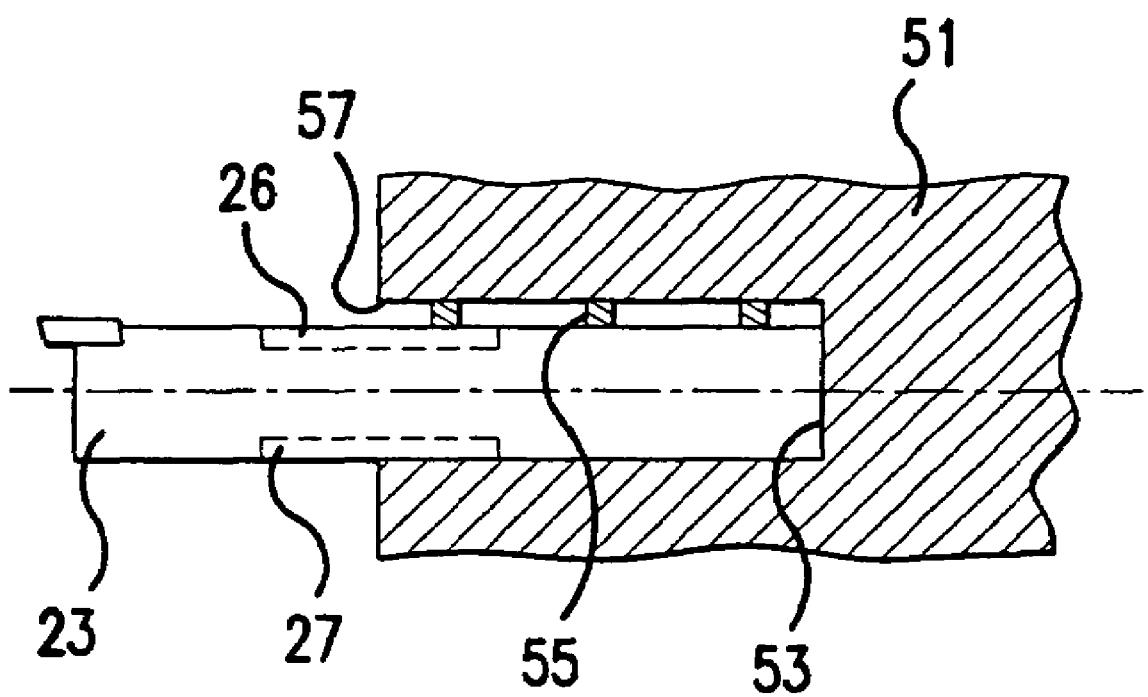
FIG. 5 is a schematic view of yet another embodiment of the tool holder according to the invention.

In FIG. 5 another advantageous embodiment is shown. The purpose of FIG. 5, which is even more simplified than the other figures, is to disclose a desirable positioning of the active elements in relation to the engagement of the tool holder in the machine, which is here a turning lathe. As shown most schematically in a cut away view in FIG. 5, the tool holder 23 is held in a mounting recess 53 of the machine 51, and, more specifically, for example in a foundation or rigid part thereof. For comparing purposes the tool holder 23 of FIG. 5 is corresponding with the tool holder 23 of FIG. 2 and corresponding referentials are used. For sake of simplicity merely two active elements 26, 27 are shown, as indicated with dashed lines. The tool holder 23 is rigidly mounted in the machine 51, which is symbolically shown with fastening screws 55. What is specific for this embodiment is that the active elements 26, 27 are positioned along the length of the tool holder 23 in such a way that they extend into the recess 53 when the tool holder 23 is properly mounted therein. Preferably about one half of each active element 26, 27 is placed inside of the recess 53 and the other half thereof is placed outside of the mouth 57 of the recess 53. This is due to location of the maximum of the bending as well as the strain energy of the tool holder 23. It can be shown that this maximum is located at the very mouth 57 of the recess 53. Traditionally it has typically been assumed that the tool holder acts like a protrusion of the rigid foundation wherein it is fastened. However, in practise the forces acting upon the tip of the tool holder causes bending thereof also within the recess 53, which bending has to be taken into account. In order to obtain a maximum effect of the dimensional changes of the active elements 26, 27, they should be positioned like in FIG. 5.

The operation of the device will no be described in conjunction with FIG. 2. However, the similar operation applies to the device as shown in FIG. 5. When during turning the tool 21 and the tool holder 23 vibrate up and down according to arrow C, the sensors 24, 25 are subjected to alternating pulling and pressing forces. Each sensor 24, 25 then generates a voltage which varies concurrently with the variations in forces. The sensor voltages are detected and analysed by the control unit 28. The control unit 28 generates two control voltages, in the form of A.C. voltages, which are supplied to an actuator 26, 27 each and are applied across the piezoceramic elements 26, 27. The piezoceramic elements 26, 27 are elongate in the longitudinal direction of the tool holder 23, and the conductors 30-33 are connected in pairs to a piezoceramic element 26, 27 each in their respective front ends 26*a*, 27*a* and rear ends 26*b*, 27*b*. When voltage is applied to the actuators 26, 27 by means of the control voltages, the piezoceramic elements 26, 27 are thus extended to a greater or smaller degree depending on the magnitude of the voltages. In other words, each piezoceramic element 26, 27 obtains a dimensional change in its longitudinal direction, which in the present example is also the longitudinal direction of the tool holder 23. The piezoceramic elements 26, 27 preferably have power-transmitting surfaces, in this case their end surfaces at the ends 26*a*, 26*b*, 27*a*, 27*b* which abut directly against surfaces in the body of the tool holder 23. Moreover, the piezoceramic elements 26, 27 are spaced from the centre axis I-I of the tool holder 23. The expression "spaced from the centre axis" means in general terms that the centre axes of the piezoceramic elements 26, 27 do not coincide with the centre axis of the tool holder 23. If the centre axes should coincide, no bending would be obtained, but merely a pure longitudinal change of the tool holder 23. In the preferred embodiment, the piezoceramic elements 26, 27 are arranged close to the surface for the moment arms to be as long as possible. In the present example, the dominating vibration is vertical, which means that the forces induced by means of the piezoceramic elements 26, 27 in the first place strive to bend the end of the tool holder 23 upwards and downwards.

The bending thus act round an axis which is perpendicular to the centre axis I-I and are controlled so as to operate in opposition to the bending induced by the workpiece 22 during working owing to its rotation. This reduces the vibrations. Thus the control unit 28 generates such control voltages that the forces induced by the actuators 26, 27 are in opposition to the forces detected by the sensors 24, 25.

The control unit 28 is selectable among many different types, such as analog, fed-back control unit, conventional PID regulator, adaptive regulator or some other control unit suitable in a current application. Preferably the control unit strives to control the vibrations towards an optimal state. The control can imply, for instance, minimising of the vibrations in one or all directions, in which case the optimal state can be completely extinguished vibrations. A large number of known control algorithms are available. It is desirable to find the most efficient one for a certain application. Regarding the above-described embodiment in connection with turning, the analysis of the sensor signals, i.e. the voltages generated by the sensors, and the generation of the control signals, i.e. the control voltages, to the piezoceramic elements 26, 27 occur as follows.

Figure 3:
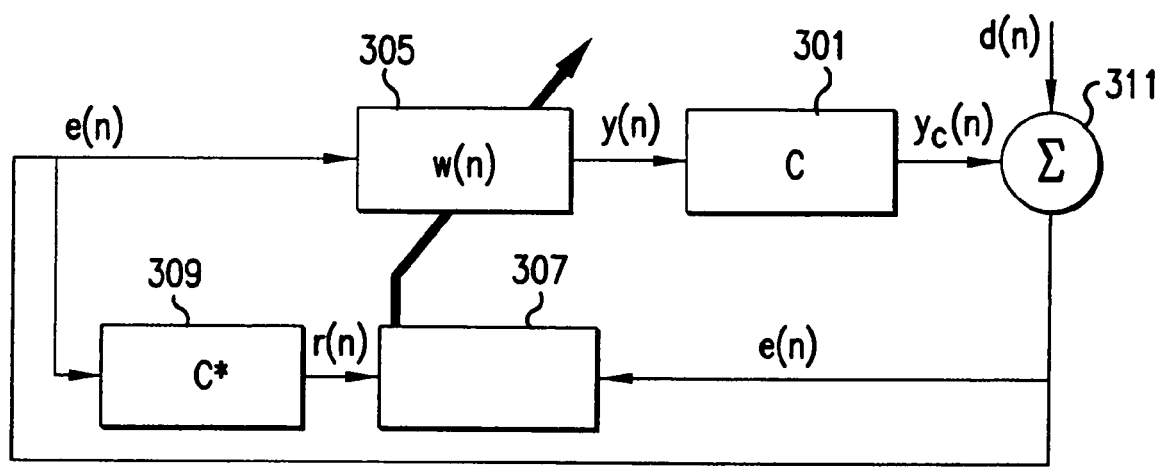
FIG. 3 is a block diagram of controlling according to the embodiment in FIG. 2.

A preferred embodiment of the control system which the control unit 28, the sensors 24, 25 and the piezoceramic elements 26, 27 constitute, is fed back and based on a so-called "Filtered-X LMS-algorithm". It is true that this algorithm is per se known to those skilled in the art. FIG. 3 illustrates an equivalent block diagram of the fed-back control system in a digital description.

Block 301, which is also designated C, represents the dynamic system controlled, which contains the actuators 26, 27 and the sensors 24, 25. The other blocks represent an implementation of said algorithm. Block 305 represents an FIR filter with adjustable coefficients, block 307 represents an adaptive coefficient adjusting means, and block 309 represents a model (C*) of the dynamic system 301.

Seen from a functional, mathematic perspective, the dynamic system constitutes a forward filter, whose output signal, i.e. the response of the dynamic system, is $y_c(n)$. The coefficient adjusting means 307 strives to optimise the coefficients of the FIR filter so that an error signal $e(n)$ is minimised. The error signal $e(n)=d(n)-y_c(n)$ where $d(n)$ is a desirable output signal. The determination of the error signal is carried out by means of a summer 311. To ensure that the coefficient adjusting means converges each time independently of its initial state, it is supplied with a reference signal $r(n)$ from the model 309 of the forward filter.

In mathematical terms it is possible to describe the effect of the invention by saying that it changes the transmission of the tool holder and, more specifically, changes the properties of one or more forward channels, each forward channel being associated with an excitation direction. This way of looking at the matter is equivalent to the effect of the invention being that control vibrations are generated, which influence the vibrations of the tool holder. It should thus be pointed out that in many cases the forward channel cannot be considered time-invariant, i.e. a traditional linear systems theory is in many cases not applicable. The system is usually non-linear.

The invention is applicable not only to turning but functions also for other types of cutting, such as milling or drilling, in which also the above described control algorithm is applicable.

Figure 4:
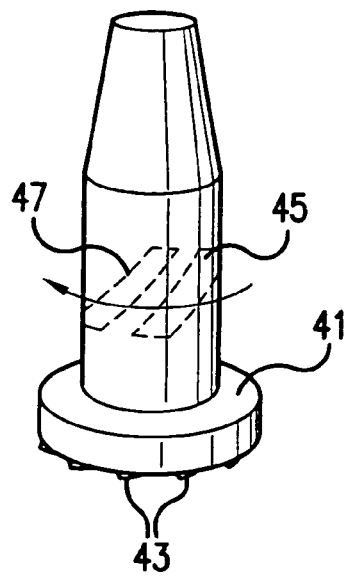
FIG. 4 illustrates a different embodiment of the invention applied to a tool for milling.

In milling, the workpiece does not rotate, but instead the tool itself and its tool holder. FIG. 4 shows a milling tool holder 41, whose direction of rotation is indicated by an arrow. The milling tool holder 41 has embedded sensors and active elements, of which two active elements 45, 47 are schematically shown. The most important vibrations that arise in milling are caused by torsion of the milling tool holder 41 owing to the engagement of the cutting edges 43 in the material of the workpiece. The milling tool holder 41 is also subjected to a certain degree of bending. The resultant forces are mainly helically directed round the axis of rotation of the milling tool holder 41. A preferred arrangement of the active elements 45, 47b therefore is in a band round the milling tool holder 41 so that the active elements have an essential extent and simultaneously a direction of action helically round the axis of rotation of the tool holder 41. Thus, the resulting bending act essentially in the same directions as said torsion. A conceivable variant of or combination with the helical arrangement, however, is also to arrange the active elements parallel with the axis of rotation.

In drilling, like in milling, the tool and the tool holder rotate. Drills have a tool in the form of drilling teeth supported by a tool holder. The teeth are usually welded to the holder. However, also so-called high-speed-steel drills are available, in which the tool holder and the tool are integrally made. Also in that case, however, the drill comprises in terms of definition a tool in the form of the actual teeth at the end of the drill and a tool holder in the form of the remaining part of the drill. In drilling, the circumstances resemble those prevailing in milling. A clear distinction, however, is to be found in the direction of feed, which in drilling is parallel with the axis of rotation of the tool holder whereas it is perpendicular to the axis of rotation of the tool in milling. A further distinction is that the entire tool abuts against the workpiece in drilling whereas in milling the abutment is only partial. Therefore, in drilling the vibrations are almost exclusively related to torsion. Active elements and sensors are arranged in about the same way as in milling, but at a greater angle to the axis of rotation.

Also vibrations in planing tools and other cutting tools can be controlled according to the invention.

An alternative arrangement of sensors is, in connection with turning, between the actual insert and the tool holder, i.e. below the insert. In that case, a pressure-sensitive sensor is used.

Besides, the sensors can be of different types. In addition to those mentioned above, use can be made of e.g. accelerometers and strain gauges. The latter, however, are less suitable than the piezoelectric sensors from the environmental point of view.

Also the active elements can be of different types within the scope of the invention. In the future, even thinner elements than those used today will probably be conceivable, for instance in the form of piezofilm (PZT). The currently preferred type, however, is piezoceramic elements.

The above-described arrangements of the sensors and actuators are examples of arrangements and many variants are possible, such as a combination of those shown or other numbers of actuators. For instance, in turning, it is possible to arrange two pairs of actuators in each direction or a plurality of actuators adjacent to those shown. In its simplest embodiment, the inventive device comprises only one actuator which comprises one active element. This, however, results in a more non-linear control system, which causes unnecessary technical difficulties in controlling. Therefore it is an advantage to balance the system by arranging, like in the embodiment shown in FIG. 2, the active elements in pairs opposite each other, i.e. opposite each other on each side of the centre axis of the tool holder. A still greater linearity is achieved if each actuator is besides formed of two active elements which are joined, for example by gluing, with each other into a double element. The double element will certainly be twice as thick as a single element, but gives a more dynamic effect, which sometimes is preferable.

The active elements are in respect of form not bound to be rectangularly parallelepipedal and plate-shaped as the elements shown, but the form may vary according to the application. The plate shape, however, is advantageous since it contributes to minimising the volume of the element. Moreover, an elongate form is a good property which also contributes to imparting to the element a small volume. It is preferred for the dimensional changes to occur in the longitudinal direction of the element.

The arrangement of the active elements in the tool holder may vary and certainly also affects the form. In addition to the above-described, preferred mounting where the elements certainly are glued to the base of the recess but two opposite power-transmitting surfaces essentially generate the bending, other alternatives are possible. One alternative implies that the dimensional change is fully transferred via the glue joint, which in principle is possible with today's strongest glues. Also other variants are contained within the scope of the invention.

The active element is covered by casting, using a suitable material. As an example, plastic materials can be mentioned. Preferably, however, a cover of metal is arranged on top and on the same level as the remaining tool holder surface.

The most common application of vibration control is to reduce the vibrations in all directions. However, this may not always be the case, at least for some of the directions. Occasionally the control can result in an actual increase of vibrations in a specific direction.

What is claimed is:

1. A device for vibration control in a machine for cutting, said machine comprising a cutting tool supported by a tool holder, the device comprising a control unit and converting means which are connected to the control unit and comprise a vibration sensor and an actuator, and the actuator comprising an active element, which converts an A.C. voltage supplied by the control unit to the actuator into changes in a dimension of said active element, wherein said active element is embedded in the body of the tool holder, and wherein said active element is embedded in such manner that said changes in a dimension impart bending moments to the body of the tool holder;

said tool holder being elongated and having an end portion which is received in a mounting recess of the machine, wherein said active element is positioned along the tool holder such that, when the tool holder is held in said recess, a portion of said active element is within said recess.

2. A device as claimed in claim 1, wherein said active element is embedded with its centre axis spaced from the centre axis of the tool holder.

3. A device as claimed in claim 1, wherein said active element is embedded close to the surface of the tool holder.

4. A device as claimed in claim 1, wherein said portion of said active element consists of approximately half of said active element.

5. A device as claimed in claim 1, wherein said active element is plate shaped.

6. A device as claimed in claim 1, wherein said actuator comprises a double element which consists of two active elements which are attached to each other.

7. A device as claimed in claim 1, wherein said active element is a piezoceramic element.

8. Use of a device as claimed in claim 1, in a machine, the machine being one of a machine for turning, a machine for milling or a machine for drilling.

9. A tool holder which is adapted to support a tool for cutting, the tool holder being a teeth holder and comprising at least one actuator, said actuator comprising, active elements which are helically arranged around the center axis of the teeth holder, which is electrically controlled to generate changes in a dimension of said active element, wherein said active element is embedded in the body of the tool holder so as to be covered and imparts, through said changes in dimension, bending moments to the body of the tool holder.

10. A tool holder as claimed in claim 9, wherein said active element is embedded with its centre axis spaced from the centre axis of the tool holder.

11. A tool holder as claimed in claim 9, wherein said active element is embedded close to the surface of the tool holder.

12. A tool holder as claimed in claim 9, wherein at least one pair of active elements is arranged in such manner that the active elements included in the pair are oppositely arranged on each side of the centre axis of the tool holder.

13. A tool holder as claimed in claim 9, wherein said active element is arranged in a recess in the tool holder and is connected with the tool holder via a glue joint which transfers at least part of said dimensional change to the tool holder, and that the recess is sealed.

14. A tool holder as claimed in claim 9, wherein said active element is arranged in a recess in the tool holder and has two opposite power transmitting surfaces, said power transmitting surfaces being engaged with surfaces of the body of the tool holder and said changes changing the distance between the power transmitting surfaces, and that the recess is sealed.

15. A tool holder as claimed in claim 9, the tool holder consisting of an insert holder for a turning lathe.

16. A tool holder as claimed in claim 9, wherein the tool for cutting is a milling machine.

17. A tool holder as claimed in claim 9, the tool holder wherein the tool for cutting is a drilling machine.

18. A tool holder as claimed in claim 9, the tool holder comprising an embedded, piezoelectric sensor element.

19. A tool holder as claimed in claim 9, wherein said embedded elements are cast into the body of the tool holder.

20. A tool holder as claimed in claim 9, wherein said active element is a piezoceramic element.

21. A tool holder which is adapted to support a tool for cutting, the tool holder comprising an actuator, said actuator comprising an active element, which is electrically controlled to generate changes in a dimension of said active element, wherein said active element is embedded in the body of the tool holder and imparts, through said changes in dimension, bending moments to the body of the tool holder;

said tool holder being arranged to be mounted in a machine for boring, said tool holder being elongated and having an end portion which is received in a mounting recess of the machine, wherein said active element is positioned along the tool holder such that, when the tool holder is held in said recess, a portion of said active element is within said recess.

22. A device as claimed in claim 21, wherein said portion of said active element consists of approximately half of said active element.

\* \* \* \* \*